US007085914B1

(12) United States Patent
Gschwind (10) Patent No.: US 7,085,914 B1
(45) Date of Patent: Aug. 1, 2006

(54) METHODS FOR RENAMING STACK REFERENCES TO PROCESSOR REGISTERS

(75) Inventor: Michael K. Gschwind, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/492,544

(22) Filed: Jan. 27, 2000

(51) Int. Cl.
*G06F 15/00* (2006.01)
(52) U.S. Cl. ..................................... 712/202; 712/217
(58) Field of Classification Search ................ 712/202, 712/205, 214, 215, 217
See application file for complete search history.

(56) References Cited

U.S. PATENT DOCUMENTS

| 3,737,871 | A | * | 6/1973 | Katzman ..................... 711/200 |
| 5,659,703 | A | * | 8/1997 | Moore et al. ................ 711/109 |
| 5,832,205 | A | | 11/1998 | Kelly et al. |
| 5,838,941 | A | | 11/1998 | Valentine et al. |
| 5,872,990 | A | | 2/1999 | Luick et al. |
| 5,911,057 | A | | 6/1999 | Shiell |
| 5,926,832 | A | * | 7/1999 | Wing et al. ................. 711/141 |
| 5,953,741 | A | * | 9/1999 | Evoy et al. .................. 711/132 |
| 6,286,095 | B1 | * | 9/2001 | Morris et al. ............... 712/216 |

OTHER PUBLICATIONS

Hamacher et al., Computer Organization, 1978, McGraw-Hill, Inc., second edition, pp. 112-114.*

Austin, et al., "Zero-Cycle Loads: Microarchitecture Support for Reducing Load Latency", IEEE Proceedings of MICRO-28, Nov. 1995, pp. 82-92.
Lamport, "How to Make a Multiprocessor Computer Than Correctly Executes Mulitprocess Programs", IEEE Transaction on Computers, vol. C-28, No. 9, Sep. 1979.
Adve, et al., "Shared Memory Consistency Models: A Tutorial", Tech. Rpt. 9512, Dept. Of Elect. And Computer Eng., Rice University, pp. 1-23, Sep. 1995.
Postiff, et al., "The Limits of Instruction Level Parallelism in SPEC95 Appliations", Int. Conf. On Architectural Support for Programming Languages and Operating Systems (ASPLOS-VIII), Workshop on Interaction Between Compilers and Computer Architecture, Oct. 1998.
Franklin, et al., "ARB: A Hardware Mechanism for Dynamic Reordering of Memory References", IEEE Transactions on Computers, vol. 45, No. 5, May 1996, pp. 552-571.

(Continued)

*Primary Examiner*—Fritz Fleming
*Assistant Examiner*—Tonia L. Meonske
(74) *Attorney, Agent, or Firm*—F. Chau & Associates, LLC (57) ABSTRACT

According to one aspect of the invention, there is provided a method for renaming memory references to stack locations in a computer processing system. The method includes the steps of detecting stack references that use architecturally defined stack access methods, and replacing the stack references with references to processor-internal registers. The architecturally defined stack access methods include memory accesses that use one of a stack pointer, a frame pointer, and an argument pointer. Moreover, the architecturally defined stack access methods include push, pop, and other stack manipulation operations.

18 Claims, 6 Drawing Sheets

OTHER PUBLICATIONS

Moshovos, et al., "Streamlining Inter-operation Memory Communication via Data Dependence Prediction", IEEE Proc. Of 30th Annual Symposium on Microarchitecture Research, Triangle Park, N. Carolina, pp. 235-245, Dec. 1997.

Tyson, et al., "Improving the Accuracy and Performance of Memory Communication Through Renaming", 1997 IEEE Proc. Of 30th Annual Symposium on Microarchitecture Research, Triangle Park, N. Carolina, pp. 218-227, Dec. 1997.

Mahlke, et al., "Sentinel Scheduling for VLIW and Superscaler Process", Int. Conf. On Architectural Support for Programming Languages and Operating Systems, (ASPLOS V), MA, USA, pp. 238-247, Oct. 1992.

UNIX Systems for Modern Architectures, Addison Wesley, pp. 285-349, Sep. 1994.

* cited by examiner

METHODS FOR RENAMING STACK REFERENCES TO PROCESSOR REGISTERS

BACKGROUND

1. Technical Field

The present invention generally relates to computer processing systems and, in particular, to methods for renaming stack references in a computer processing system.

2. Background Description

Figure 1:
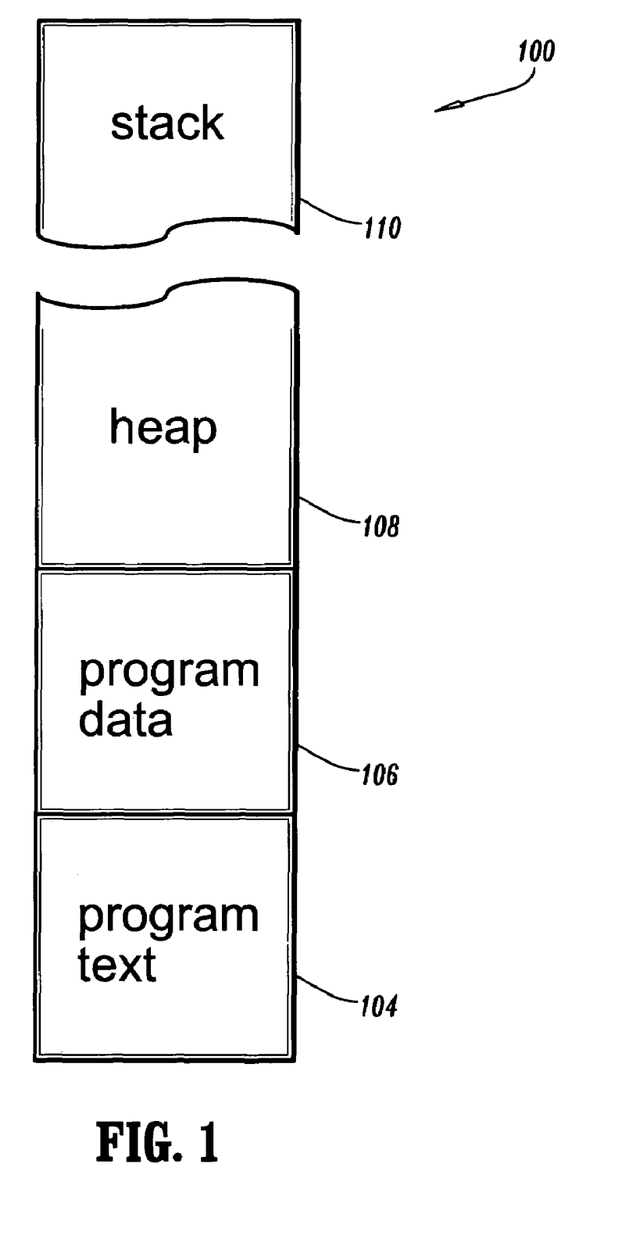
FIG. 1 is a diagram illustrating a typical memory layout of a computer program according to the prior art.

A memory serves as a repository of information in a computer processing system. FIG. 1 is a block diagram illustrating a typical layout of a memory 100 of a computer program according to the prior art. The layout consists of distinct memory areas, including a program text area 104, a program data area 106, a heap 108, and a program stack 110. Program text area 104 is used to store program text (i.e., computer instructions). Program data area 106 is used to store program data (for static data references). Heap 108 is used for dynamically allocated objects and program stack 110 is used for function-local variables.

As shown, memory 100 stores different types of data in distinct memory areas. The following different mechanisms are used to access these memories:

1. Program text area 104 stores the computer instructions describing the actions of a program, and possibly program constants. Program text area 104 is usually read-only and accessed using the program counter.
2. Program data area 106 holds static data references, e.g., global program variables. Program data area 106 is accessed using either a global data pointer or a table of contents data structure.
3. Heap 108 holds dynamically allocated objects and is accessed using pointers held in any of the processor registers.
4. Program stack 110 usually holds function-local variables and is accessed using special-purpose registers, such as the stack pointer (SP), frame pointer (FP), or argument pointer (AP).

Usually, all program memory can be accessed through the use of pointers which are stored in a register. However, the access mechanisms described above are generally used for each area in typical programs.

In general, a processor accesses information from the memory, performs computations thereon, and stores the results back to memory. Unfortunately, memory access incurs a number of costs. A description of some of these costs will now be given.

When a memory access operation is first detected, the address to be accessed must be resolved. Moreover, the registers employed for the address computation must be available.

If the processor wants to reorder memory read operations with respect to other memory operations, and it cannot be determined that the read addresses are different at the time when they are to be reordered, then checks for memory address ambiguities need to be performed.

In addition, since store operations modify the processor state, they typically have to be performed in-order. This causes further slowdowns in achievable processor performance by serializing operations when multiple live ranges are assigned to the same memory location. Thus, limitations are typically imposed on the degree of reordering that can be performed in a superscalar processor, when multiple independent values are assigned to the same memory address.

Moreover, load and store operations typically require access to a cache(s). However, accessing a cache is slower in comparison to accessing processor registers, which represent a higher level in the memory hierarchy of a computer processing system.

Many of the serializing effects of memory references result from the way in which programs are written by programmers. However, serializing effects of memory references may also result from the way programs are translated from their source level representation to the actual machine. In such a case, references are made to the program stack.

The program stack stores stack frames, that is, records containing the values for local variables of functions, as well as parameters passed between functions. Stack locations are reused frequently, with different functions using memory locations with the same address to store unrelated objects.

Consider the following example code written in the C programming language:

```
int mult3 (int a)
{
    return a * 3;
}
int inc (int b)
{
    return b+1;
}
int compute(int a, int b)
{
    int tmp1, tmp2;
    tmp1 = mult3 (a);
    tmp2 = inc (b);
    return tmp1+tmp2;
}
```

When this code is translated to Intel x86 machine code, the following intructions will be generated:

```
 1  mult3:
 2      imull $3,4 (%esp),%eax
 3      ret
 4
 5  inc:
 6      movl 4(%esp),%eax
 7      incl %eax
 8      ret
 9
10  compute:
11      pushl %esi
12      pushl %ebx
13      movl 12(%esp),%eax
14      movl 16(%esp),%ebx
15      pushl %eax
16      call mult3
17      addl $4,%esp
18      movl %eax,%esi
19      pushl %ebx
20      call inc
21      addl $4,%esp
22      addl %esi,%eax
23      popl %ebx
24      popl %esi
25      ret
```

The immediately preceding code illustrates several examples of the inefficiencies of holding the processor stack in memory:

1. The values of registers ESI and EBX are stored on the stack at instructions 11 and 12' and restored at instructions 23 and 24. These values could have been held in processor-internal registers.

2. The parameters a and b which were pushed onto the stack by the calling function must be read from the stack into a processor register, and then stored on the stack for functions mult3 and inc, respectively.
3. The parameters a and b for functions mult3 and inc, respectively, are stored at the same stack location, so operations from function inc cannot be scheduled at the same time as the instructions for function mult3. This serialization is not necessary.

The serializing effects of stack references due to the reuse of memory locations and the manipulation of the stack pointer is described by Postiff et al., in "The Limits of Instruction Level Parallelism in SPEC95 Applications", International Conference on Architectural Support for Programming Languages and Operating Systems (ASPLOS-VIII) Workshop on Interaction between Compilers and Computer Architectures (INTERACT-3), October 1998. Postiff et al. further describe the performance improvements which can be achieved by resolving these serializing effects.

3. Problems with the State of the Art

It is to be appreciated that previous memory renaming has been based on renaming of general memory references, and has tended to ignore multiprocessor effects. Some of these prior art approaches will now be described.

It is to be appreciated that memory renaming typically includes the prediction of data dependencies. A mechanism to predict data dependencies dynamically without computation of the address is described by A. Moshovos and G. Sohi, in "Streamlining Inter-operation Memory Communication via Data Dependence Prediction", Proceedings of 30th Annual International Symposium on Microarchitecture Research Triangle Park, N.C., December 1997. Predicting dependencies is necessary because the addresses of load and store operations may be unresolved. To ensure correctness of the predictions, these memory operations need to be eventually executed. A similar approach for predicting dependencies is described by G. Tyson and T. Austin, in "Improving the Accuracy and Performance of Memory Communication Through Renaming", Proceedings of 30th Annual International Symposium on Microarchitecture Research, Triangle Park, N.C., December 1997. Moshovos & Sohi and Tyson & Austin provide a general technique for promoting accesses to memory into processor-internal registers. This requires hardware of significant complexity. Moreover, prediction is used, which is not as accurate as actual decoding of the instruction, and may require expensive repair actions. An address resolution buffer which supports out-of-order execution of memory operations and memory renaming is described by M. Franklin and G. Sohi, in "ARB: A Hardware Mechanism for Dynamic Reordering of Memory References", IEEE Transactions on Computers, Vol. 45, No. 5, May 1996. Disadvantageously, this buffer is expensive, the required hardware is complex, and the buffer does not consider multiprocessor systems and their consistency requirements.

U.S. Pat. No. 5,911,057, entitled "Superscalar Microprocessor Having Combined Register and Memory Renaming Circuits, Systems, and Methods", issued on Jun. 8, 1999, the disclosure of which is incorporated herein by reference, describes an architecture for renaming memory and register operands and in uniform fashion. Memory coherence is based on "snooping" memory requests. While this approach is sufficient for in the in-order execution of memory operations in a multiprocessor computing system, out-of-order operation in a multiprocessor system may generate incorrect results. U.S. Pat. No. 5,838,941, entitled "Out-of-order Superscalar Microprocessor with a renaming Device that Maps Instructions from memory to Registers", issued on Nov. 17, 1998, the disclosure of which is incorporated herein by reference, describes symbolic renaming of memory references. The invention deals with equivalence of all types, and requires lookup of an associative array to establish equivalence between expression and names. This results in a complex architecture with potentially severe cycle time impact.

Thus, it would be desirable and highly advantageous to have a method for eliminating serializing effects resulting from stack references. It would be further desirable and advantageous if such method was applicable in a multiprocessor system.

SUMMARY OF THE INVENTION

The problems stated above, as well as other related problems of the prior art, are solved by the present invention, methods for renaming stack references in a computer processing system.

According to a first aspect of the invention, there is provided a method for renaming memory references to stack locations in a computer processing system. The method includes the steps of detecting stack references that use architecturally defined stack access methods, and replacing the stack references with references to processor-internal registers.

According to a second aspect of the invention, the method further includes the step of synchronizing an architected state between the processor-internal registers and a main memory of the computer processing system.

According to a third aspect of the invention, the method further includes the step of inserting in-order write operations for all of the stack references that are write stack references.

According to a fourth aspect of the invention, the method further includes the step of performing a consistency-preserving operation for a stack reference that does not use the architecturally defined stack access methods.

According to a fifth aspect of the invention, the step of performing a consistency-preserving operation includes the step of bypassing a value from a given processor-internal register to a load operation that references a stack area and that does not use the architecturally defined stack access methods.

According to a sixth aspect of the invention, the architecturally defined stack access methods include memory accesses that use one of a stack pointer, a frame pointer, and an argument pointer.

According to a seventh aspect of the invention, the architecturally defined stack access methods include push, pop, and other stack manipulation operations.

According to an eighth aspect of the invention, there is provided a method for renaming memory references to stack locations in a computer processing system. The method includes the step of determining whether a load instruction references a location in a local stack using an architecturally defined register for accessing a stack location. It is determined whether a rename register exists for the referenced location in the local stack, when the load instruction references the location using the architecturally defined register. The reference to the location is replaced by a reference to the rename register, when the rename register exists.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to methods for renaming stack references in a computer processing system. According to the invention, the stack references are renamed to processor-internal registers. By concentrating on the frequent rename opportunities for stack references, the renaming architecture can be more efficiently implemented than prior art approaches to renaming memory references.

Such efficiency is derived from two aspects. With respect to the first aspect, the names are easier to determine, since references to the processor stack use a limited number of addressing registers such as the stack and frame pointers. This reduces the possible ambiguities that can arise in the renaming of memory locations using different general purpose registers. While accesses using other registers are possible, they are sufficiently infrequent to be handled using simple disambiguation techniques.

With respect to the second aspect, the need to perform consistency-preserving operations in a multiprocessor system is significantly reduced, since stack references are usually referenced only from the local process. Again, references from other processors are possible, but since they are infrequent, they can be resolved using simple techniques.

It is to be appreciated that by renaming stack references to processor registers, stack references become amenable to a number of optimizations typically applied to processor registers, such as reordering of references, renaming to resolve anti-dependencies, and speculative execution of write operations.

To facilitate a clear understanding of the present invention, definitions of terms employed herein will now be given. A load instruction refers to any instruction performing a memory read-access and (optionally) computations based on the loaded value. Thus, a load instruction may include, for example, logic, arithmetic and other instructions which employ data from memory locations as operands. A store instruction refers to any instruction performing a memory write-access and, optionally, computations. Out-of-order execution is a technique by which the operations in a sequential stream of instructions are reordered so that operations appearing later are executed earlier, if the resources required by the later appearing operations are free. Thus, an out-of-order instruction may be created, either statically or dynamically, by moving an instruction from its original position in a sequence of instructions to an earlier position in the sequence of instructions.

The following description and corresponding examples will be given based on two instructions (unless otherwise noted), a first instruction which is executed out-of-order before a second, logically preceding instruction, which will be termed an in-order instruction. Thus, unless otherwise noted, the designation 'in-order' refers only to the sequential relationship between the logically preceding in-order instruction and the first 'out-of-order' instruction. It is to be noted that the above two instructions (i.e., both the in-order and the out-of-order load instructions) may be in-order or out-of-order with respect to a third instruction (and so forth).

A general description of the present invention will now be provided to introduce the reader to the concepts of the invention. Subsequently, more detailed descriptions of various aspects of the invention will be provided.

The present invention simplifies the issue of memory renaming by renaming only memory stack references (as opposed to renaming all memory references). Such an approach is advantageous for at least the following reasons:

1. Performance degradations due to the serializing effects of stack references are artificially introduced by the translation process and not intrinsic in the program.
2. Significant performance gain can be achieved by simply renaming the stack references.
3. The "names" of stack accesses are easy to determine since the stack and frame pointers have well-defined semantics (unlike other registers which could point to any location in memory).
4. Since stack references are usually local to one process and a single processor, and are made through the stack or frame pointers, the importance of multiprocessor consistency is reduced.
5. Detecting naming equivalence is easy because references to the stack are usually only through the stack or frame pointers (the frame pointer is usually at a well-defined distance from the stack pointer).

Consistency between different references to memory is resolved by observing that stack references are usually only to the local processor stack and only through the registers specifically designated to manage the stack, such as the stack pointer (SP), the frame pointer (FP), and an optional argument pointer (AP).

References to the stack area of one processor by any means other than these specifically designated stack-management registers result in the performing of actions to preserve consistency. Such references can be easily detected. For example, accesses to the local processor stack by a general register (a register other than a stack register such as, for example, SP, FP, and AP) can be detected by tagging page table entries that contain the stack, and indicating the condition in the memory unit. The processor can then handle this situation in hardware or raise an exception and resolve the condition in the exception handler. As another example, in a multiprocessing system, accesses to the stack of another processor can be detected by not making entries available in the translation lookaside buffer (TLB), thereby taking an exception and handling the condition in software, or by indicating in the TLB that a page is used to store the stack on a remote processor.

Figure 2:
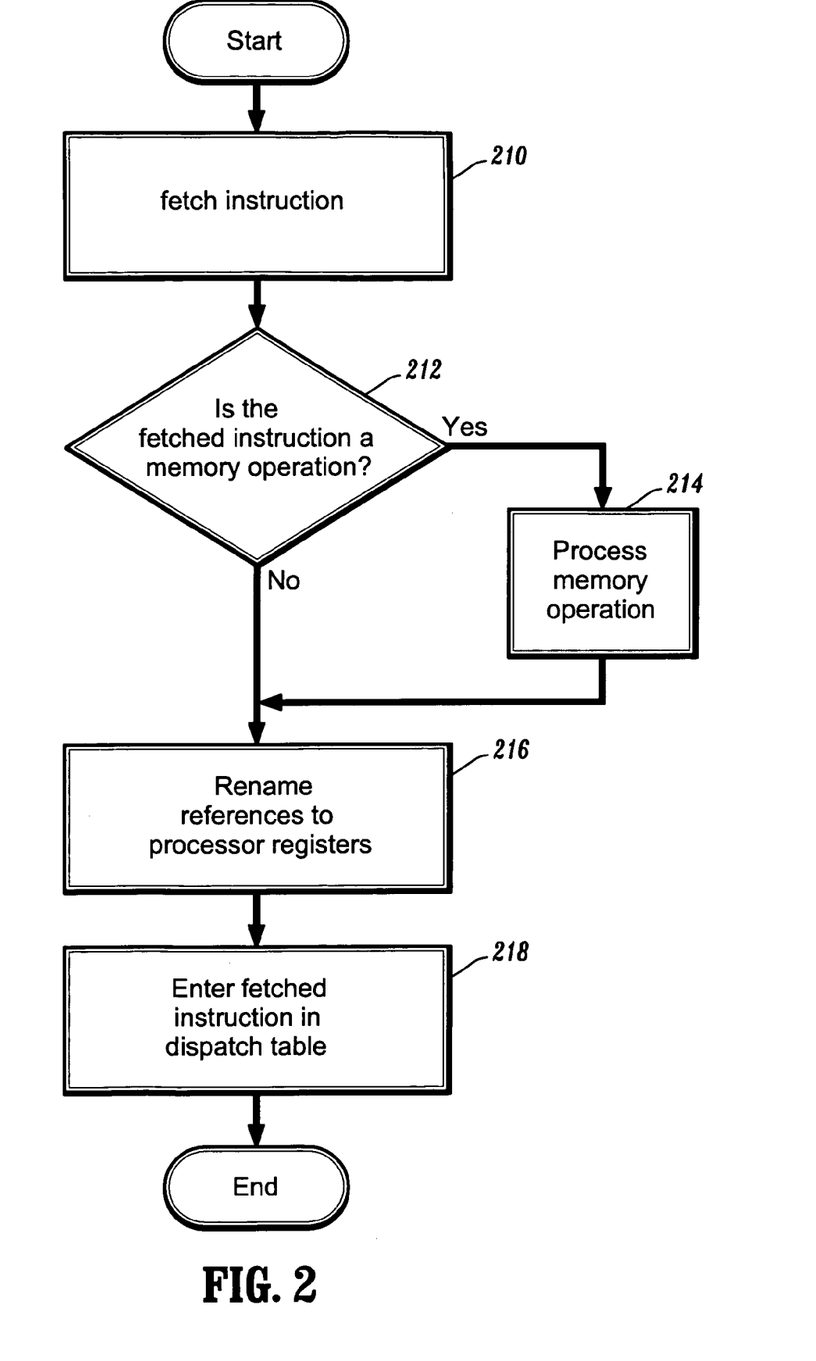
FIG. 2 is a flow diagram illustrating a method for performing the initial processing of a single instruction according to an illustrative embodiment of the present invention.

FIG. 2 is a flow-diagram illustrating a method for performing the initial processing of a single instruction according to an illustrative embodiment of the present invention.

The instruction is fetched from the program memory 100 (step 210). It is then determined whether the fetched instruction is a memory operation (i.e., whether the fetched instruction references memory 100) (step 212). If so, then the memory operation is processed in accordance with the present invention (step 214). The particular processing steps are shown in detail in FIGS. 3 and 4 for an instruction referencing the memory for read access, and in FIG. 5 for an instruction referencing the memory for write access.

If the fetched instruction is not a memory operation, then references to processor registers are renamed (step 216). It is to be appreciated that step 216 is optional and, thus, may be omitted if so desired. The instruction is then entered in the dispatch table for dispatch to one of the execution units (step 218), and the method is terminated.

Figure 3:
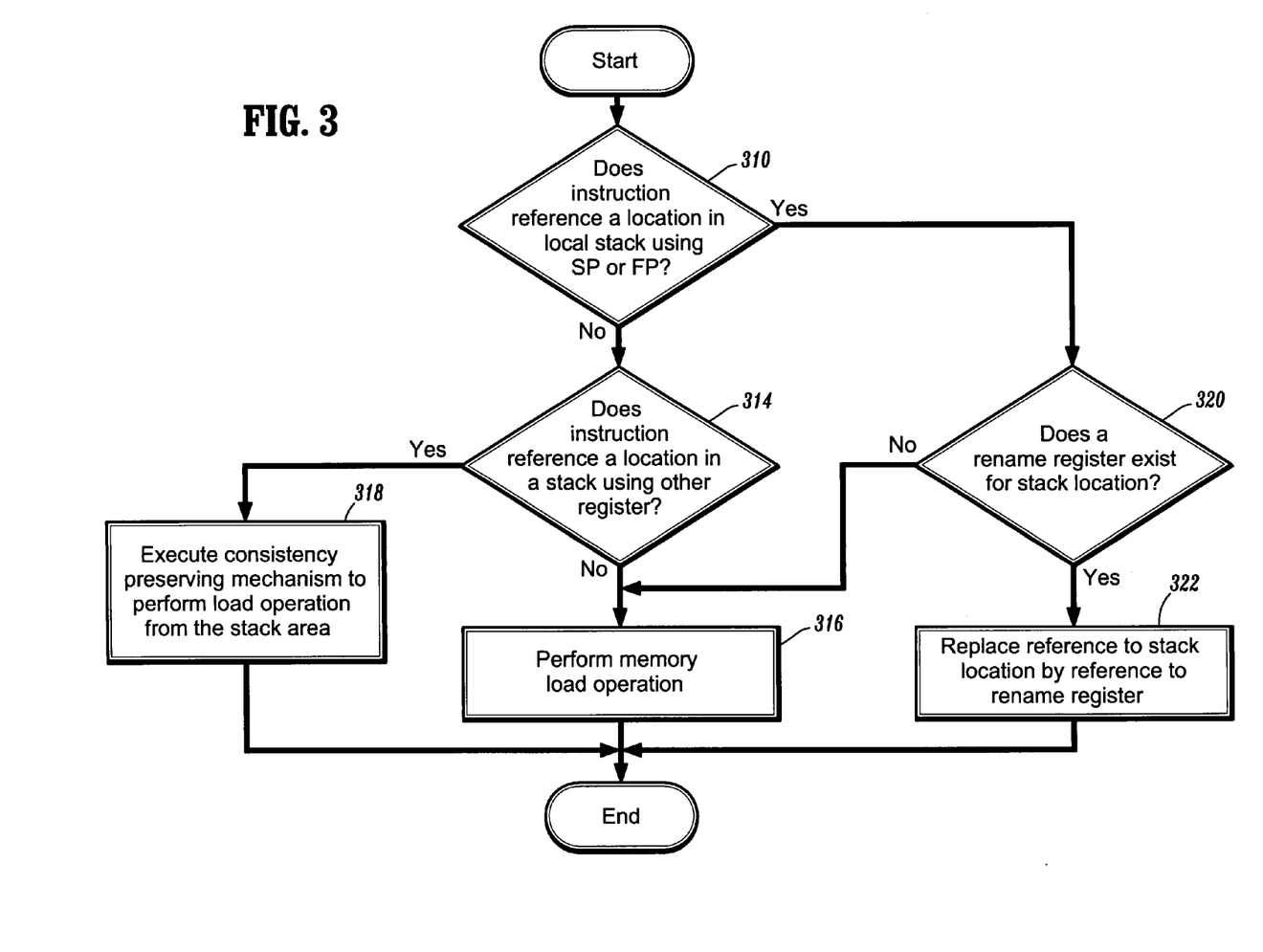
FIG. 3 is a flow diagram illustrating the processing of load operations according to an illustrative embodiment of the present invention.

FIG. 3 is a flow diagram illustrating the processing of a load operation (e.g., step 214 of FIG. 2) according to an illustrative embodiment of the present invention. In general, if a rename register is found for a memory read reference, then the memory read reference is replaced by a reference to the rename register. Otherwise, a load from the stack location stored in memory is performed.

According to the method of FIG. 3, it is determined whether the load instruction references a location in the local stack using the stack pointer SP or frame pointer FP (step 310). With respect to some architectures, step 310 could optionally determine whether the load instruction references any additional pointers used to access a stack location, such as the argument pointer AP in the DEC VAX architecture. The load instruction does not have to reference the SP, FP or AP registers explicitly, but can be an instruction such as push or pop (e.g., as found in the Intel x86 architecture) which references at least one such pointer implicitly.

If the load instruction references a location in the local stack using the stack pointer SP or frame pointer FP, then the method proceeds to step 320. Otherwise, it is determined whether the load instruction references a location in a stack using any other register (step 314). Unlike the determination made in step 310, which was concerned with only a local stack location, the determination made in step 314 encompasses both a local or a remote stack location.

Step 314 can be performed during either the decode, address generation, or memory access phase. According to an illustrative embodiment of the present invention, one implementation of step 314 may include marking TLB entries of pages in stack 110 (see FIG. 1) as containing stack references.

If the load instruction does not reference a location in a stack using any other register, a normal load operation (i.e., a load operation from main memory or a cache) is performed and then the method is terminated (step 316). However, if the load instruction does reference a location in a stack using any other register, then a consistency-preserving mechanism is executed to perform a load operation from the stack area (step 318). The consistency preserving mechanism can be implemented in hardware, software, or a combination thereof. Illustrative embodiments of the consistency preserving mechanism are described in detail hereinbelow.

At step 320, it is determined whether a rename register exists for the referenced location in the local stack. Step 320 can be performed using either a symbolic address, i.e., "(SP)+100" for a memory reference with displacement 100 from the stack pointer, or by actually computing the address of the referenced location.

If a rename register exists for the referenced location in the local stack, then the reference to the stack location is replaced by a reference to the rename register and the method is terminated (step 322). However, if a rename register does not exist for the referenced location in the local stack, then a normal load instruction (i.e., a load instruction from main memory or a cache) is inserted in the instruction stream and the method is terminated (step 324).

Restricting memory renaming to stack references provides advantages that simplify address resolution with respect to the above prior art approaches for memory renaming. Thus, unlike data dependency prediction as used by A. Moshovos and G. Sohi, in the above referenced article entitled "Streamlining Inter-operation Memory Communication via Data Dependence Prediction", actual dependencies can be determined by decoding the instruction.

Moreover, unlike the approach for other symbolic renaming techniques, symbolic renaming of stack references does not require complex logic to determine equivalencies, such as that described in U.S. Pat. No. 5,838,941, entitled "Out-of-order Superscalar Microprocessor with a Renaming Device that Maps Instructions from Memory to Registers", issued on Nov. 17, 1998, the disclosure of which is incorporated herein by reference. With respect to the approach of the present invention, all references are through one of the stack registers which are at an easily determinable offset from each other.

It is to be appreciated that the method of FIG. 3 requires adjustment of references as the stack pointer value is changed (e.g., on subroutine calls). However, such adjustments may be readily made by one of ordinary skill in the related art.

Using absolute addresses is also simplified, since the values of the stack pointer and frame pointer are easy to determine and change infrequently. In particular, changes to these registers involve simple arithmetic, which can be performed speculatively with a shadowed stack pointer used only for renaming in the stack reference rename logic.

Figure 4:
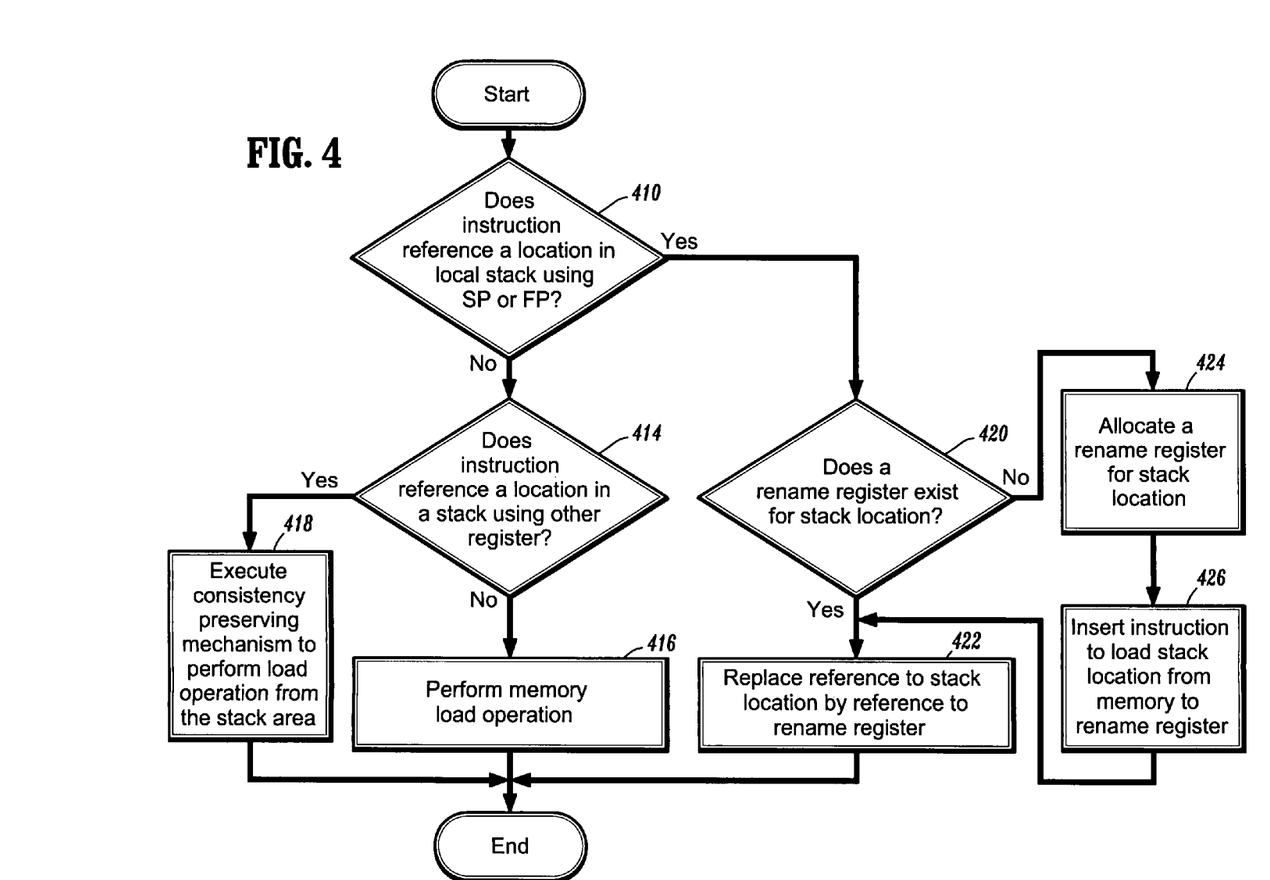
FIG. 4 is a flow diagram illustrating the processing of a load operation according to another illustrative embodiment of the present invention.

FIG. 4 is a flow diagram illustrating the processing of a load operation (e.g., step 214 in FIG. 2) according to another illustrative embodiment of the present invention. In general, if a rename register is found for a stack location, then the memory reference is replaced by a reference to the rename register. Otherwise, a new rename register is allocated, an instruction to load the value from the stack to the rename register is inserted into the instruction stream, and the original reference to the memory location is replaced by a reference to the newly allocated rename register.

According to the method of FIG. 4, it is determined whether the load instruction references a location in the local stack using the stack pointer SP or frame pointer FP (step 410). With respect to some architectures, step 410 could optionally determine whether the load instruction references any additional pointers used to access a stack location, such as the argument pointer AP in the DEC VAX architecture. The load instruction does not have to reference the SP, FP or AP registers explicitly, but can be an instruction such as push or pop (e.g., as found in the Intel x86 architecture) which references at least one such pointer implicitly.

If the load instruction references a location in the local stack using the stack pointer SP or frame pointer FP, then the method proceeds to step 420. Otherwise, it is determined whether the load instruction references a location in a stack using any other register (step 414). Step 414 can be performed during either the decode, address generation, or memory access phase. According to an illustrative embodiment of the present invention, one implementation of step 414 may include marking TLB entries of pages in the stack memory area (see FIG. 1) as containing stack references.

If the load instruction does not reference a location in a stack using any other register, then a normal load operation (i.e., a load operation from main memory or a cache) is performed and the method is terminated (step 416). However, if the load instruction does reference a location in a stack using any other register, then a consistency-preserving mechanism is executed to perform a load operation from the stack area (step 418). The consistency preserving mechanism can be implemented in hardware, software, or a combination thereof. Illustrative embodiments of the consistency preserving mechanism are described in detail hereinbelow.

At step 420, it is determined whether a rename register exists for the referenced location. This test can be performed using either a symbolic address, i.e., "(SP)+100" for a memory reference with displacement 100 from the stack pointer, or by actually computing the address of the referenced location. Restricting memory renaming to stack references provided advantages as described above with respect to FIG. 3.

Irrespective of the naming technique used, if a rename register exists for the referenced location, then the reference to the stack location is replaced by a reference to the rename register and the method is terminated (step 422). However, if a rename register does not exist for the referenced location, then a rename register is allocated for the stack location referenced by the load operation (step 424). Then, a load instruction is inserted in the instruction stream to load the value from the processor into the newly allocated rename register (step 426), and the method returns to step 422.

Figure 5:
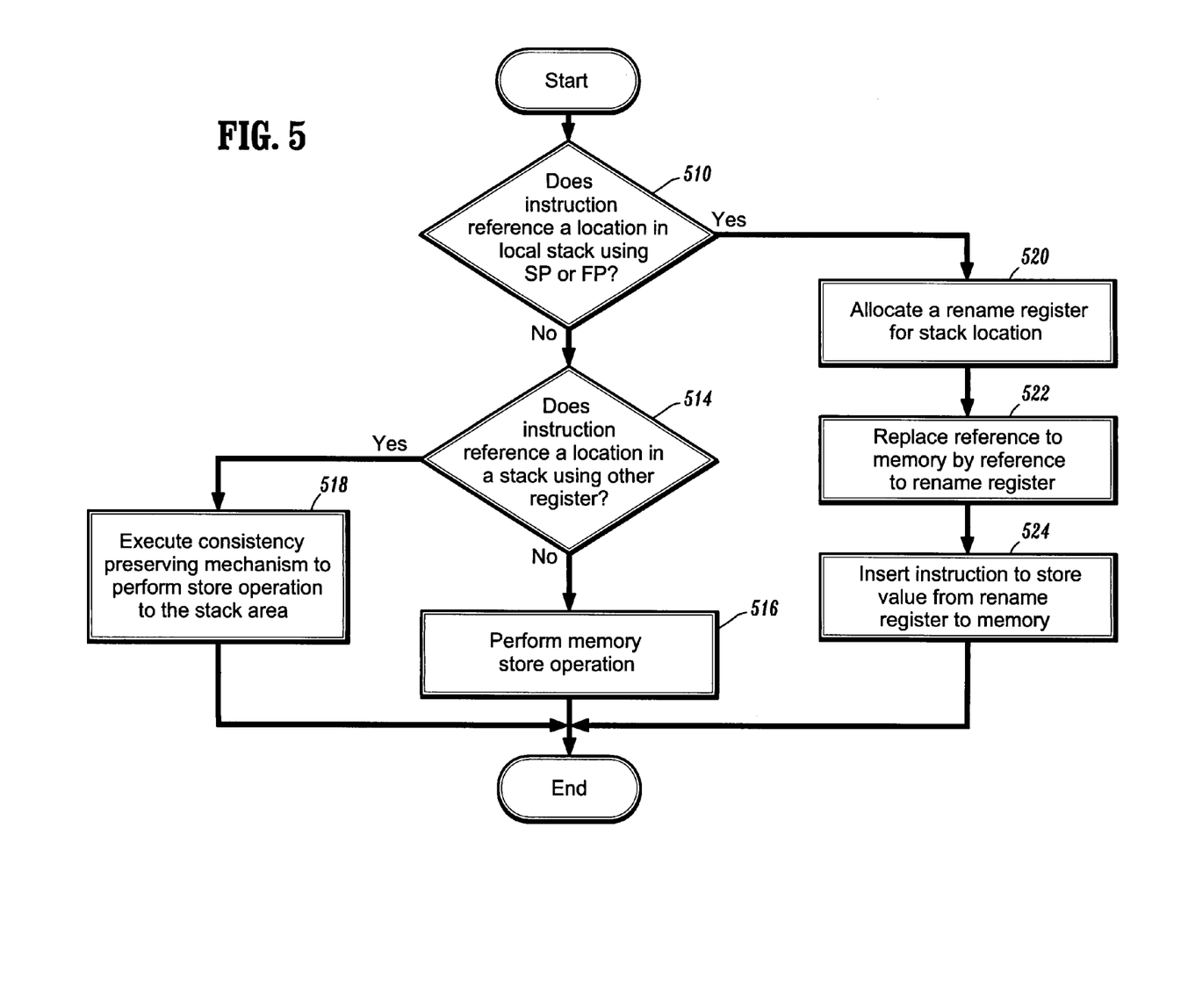
FIG. 5 is a flow diagram illustrating the processing of store operations according to an illustrative embodiment of the present invention.

FIG. 5 is a flow diagram illustrating the processing of a store operation (e.g., in unit 620 of FIG. 6) according to an illustrative embodiment of the present invention.

It is determined whether the store instruction references a location in the local stack using the stack pointer SP or frame pointer FP (step 510). With respect to some architectures, step 510 could optionally determine whether the store instruction references any additional pointers used to access a stack location, such as the argument pointer AP in the DEC VAX architecture. The store instruction does not have to reference the SP, FP or AP registers explicitly, but can be an instruction such as push or pop (e.g., as found in the Intel x86 architecture) which references at least one such pointer implicitly.

If the store instruction references a location in the local stack using the stack pointer SP or frame pointer FP, then the method proceeds to step 520. Otherwise, it is determined whether the store instruction references a location in a stack using any other register (step 514). Unlike the determination made in step 510 which was concerned with only a local stack location, the determination made in step 514 encompasses both a local or a remote stack location. Step 514 can be performed during either the decode, address generation, or memory access phase. According to an illustrative embodiment of the present invention, one implementation of step 514 may include marking TLB entries of pages in the stack memory area (see FIG. 1) as containing stack references.

If the store instruction does not reference a location in a stack using any other register, then a normal store operation (i.e., a store operation from main memory or a cache) is performed and the method is terminated (step 516). However, if the instruction does reference a location in a stack using any other register, then a consistency-preserving mechanism is executed to perform a store operation to the stack area (step 518). The consistency preserving mechanism can be implemented in hardware, software, or a combination thereof. Illustrative embodiments of the consistency preserving mechanism are described in detail hereinbelow.

At step 520, a new rename register is allocated for the stack location referenced by the store operation. The rename register can be named using either a symbolic address, i.e., "(SP)+100" for a memory reference with displacement 100 from the stack pointer, or by actually computing the address. Restricting memory renaming to stack references provides advantages as described above with respect to FIG. 3.

The memory reference is replaced by a reference to the newly allocated rename register (step 522). An instruction to store the value from the rename register to memory is inserted into the instruction stream (step 524), and the method is terminated. It is to be appreciated that step 524 is optional and, thus, may be omitted if so desired.

A conventional implementation of a processor capable of dynamically scheduling instructions (an out-of-order issue processor) includes the following features:

1. A mechanism for issuing instructions out-of-order, which includes the ability to detect dependencies among the instructions, rename the registers used by an instruction, and detect the availability of the resources used by an instruction;
2. A mechanism for maintaining the out-of-order state of the processor, which reflects the effects of instructions as they are executed (out-of-order);
3. A mechanism for retiring instructions in program order, and simultaneously updating the in-order state with the effects of the instructions being retired; and
4. A mechanism for retiring an instruction in program order without updating the in-order state (effectively canceling the effects of the instruction being retired), and for resuming in-order execution of the program starting at the instruction being retired (which implies canceling all the effects present in the out-of-order state).

Mechanism 3 from the list above is used to retire instructions when the effects of the instructions being retired are correct. Alternatively, mechanism 4 is used whenever there is some abnormal condition resulting from the execution of the instruction being retired or from some external event.

Figure 6:
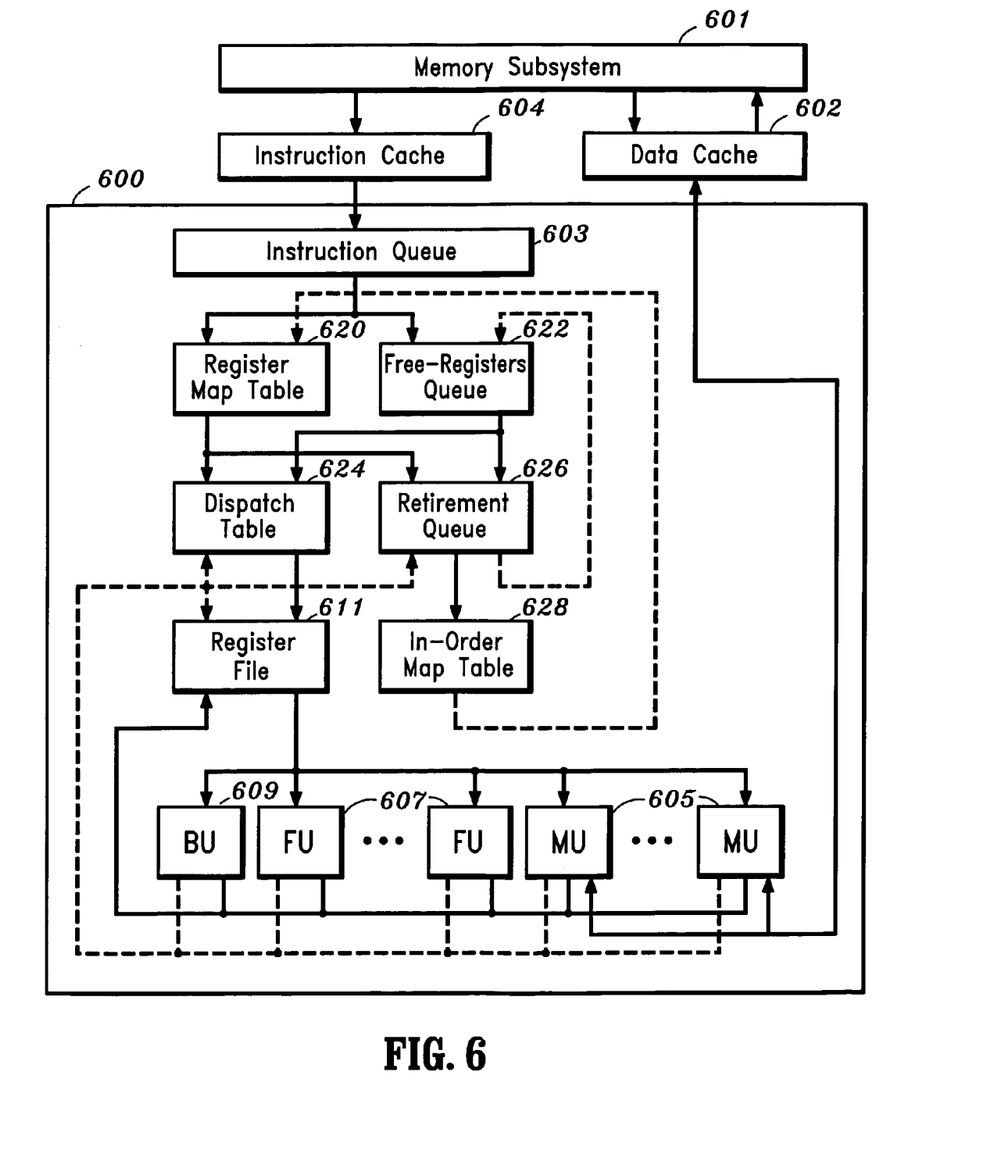
FIG. 6 is a block diagram illustrating a superscalar out-of-order processor to which the present invention is applied.

FIG. 6 is a functional block diagram of a conventional computer processing system (e.g., including a superscalar processor) to which the present invention may be applied. The system of FIG. 6 supports reordering of memory operations using the mechanisms listed above, but excluding the ability to rename and execute references to the program stack out-of-order. The system consists of: a memory subsystem 601; a data cache 602; an instruction cache 604; and a processor unit 600. The processor unit 600 includes: an instruction queue 603; several memory units (MUs) 605 for performing load and store operations; several functional units (FUs) 607 for performing integer, logic and floating-point operations; a branch unit (BU) 609; a register file 611; a register map table 620; a free-registers queue 622; a dispatch table 624; a retirement queue 626; and an in-order map table 628. This exemplary organization is based on the one described in the article by M. Moudgill, K. Pingali, and S. Vassiliadis, "Register Renaming and Dynamic Speculation: An Alternative Approach", Proceedings of the 26th Annual International Symposium on Microarchitecture, pp. 202–13 (December 1993).

In the processor depicted in FIG. 6, instructions are fetched from instruction cache 604 (or from memory subsystem 601, when the instructions are not in instruction cache 604) under the control of branch unit 609, placed in instruction queue 603, and subsequently dispatched from instruction queue 603. The register names used by the instructions for specifying operands are renamed according to the contents of register map table 620, which specifies the current mapping from architected register names to physical registers. The architected register names used by the instructions for specifying the destinations for the results are assigned physical registers extracted from free-registers queue 622, which contains the names of physical registers not currently being used by the processor. The register map table 620 is updated with the assignments of physical registers to the architected destination register names specified by the instructions. Instructions with all their registers renamed are placed in dispatch table 624. Instructions are also placed in retirement queue 626, in program order, including their addresses, and their physical and architected register names. Instructions are dispatched from dispatch table 624 when all the resources to be used by such instructions are available (physical registers have been assigned the expected operands, and functional units are free). The operands used by the instruction are read from register file 611, which typically includes general-purpose registers (GPRs), floating-point registers (FPRs), and condition registers (CRs). Instructions are executed, potentially out-of-order, in a corresponding memory unit 605, functional unit 607 or branch unit 609. Upon completion of execution, the results from the instructions are placed in register file 611. Instructions in dispatch table 624 waiting for the physical registers set by the instructions completing execution are notified. The retirement queue 626 is notified of the instructions completing execution, including whether they raised any exceptions. Completed instructions are removed from retirement queue 626, in program order (from the head of the queue). At retirement time, if no exceptions were raised by an instruction, then in-order map table 628 is updated so that architected register names point to the physical registers in register file 611 containing the results from the instruction being retired; the previous register names from in-order map table 628 are returned to free-registers queue 622.

On the other hand, if an instruction has raised an exception, then program control is set to the address of the instruction being retired from retirement queue 626. Moreover, retirement queue 626 is cleared (flushed), thus canceling all unretired instructions. Further, the register map table 620 is set to the contents of in-order map table 628, and any register not in in-order map table 628 is added to free-registers queue 622.

In addition to the components above, superscalar processors may contain other components such as branch-history tables to predict the outcome of branches.

According to the present invention, a conventional superscalar processor that supports reordering of load instructions with respect to preceding load instructions (as shown in FIG. 6) may be augmented with the following:
  A. A first mechanism for detecting load and store operations (explicit load or store operations, or any other operations which reference memory using the stack or frame pointers, as typically found in CISC instruction sets).
  B. A second mechanism for converting a load or store operation into a reference to an internal register.
  C. A third mechanism to detect whether any other load instruction (which does not address memory through the stack and frame pointers) refers to the processor stack, and providing the value to the instruction.
  D. A fourth mechanism for detecting a memory reference to another processor's stack area, and retrieve the value.

In addition, mechanism 4 above is preferably extended to force all stack references currently stored in rename registers to processor memory. This is particularly simple if, in step 524 of FIG. 5, memory write instructions are entered into the instruction stream to record all stack references in processor memory in-order.

The mechanisms provided by this invention are used in conjunction with the mechanisms available in the conventional out-of-order processor depicted in FIG. 6, as follows. The first mechanism, which detects memory operations, is implemented in the register map table 620. If the memory operation refers to a stack reference, it is converted into a reference to a rename register using the second mechanism. Rename registers for stack references may be shared with those used for general purpose registers, or they may be implemented as distinct processor resources.

The third and fourth mechanisms are implemented in memory units 605 and in system software following a hybrid organization.

The third mechanism for the detection of interference between general-register based memory accesses and local stack references is preferably performed by marking TLB entries referring to the processor stack. In this embodiment, references to such pages using a general register cause the processor to discard all speculative state and perform the operation in-order. According to this embodiment, the in-order values of stack references have been stored to the processor memory by store instructions which were inserted in program order (step 524 of FIG. 5). Processing then continues with the instruction following the current instruction.

The fourth mechanism is implemented by not loading page translations for memory locations which are used as program stack in remote processors. As a result, a reference to a stack location on a remote processor raises an exception, whereupon the system software can synchronize the memory read request from the remote processor's stack area with that processor.

According to one illustrative embodiment of the present invention, this is performed in software by sending a request to the operating system kernel executing on the remote processor. According to another illustrative embodiment of the present invention, this request and the necessary actions to ensure consistency are performed in hardware.

A brief description of the consistency preserving mechanism of steps 318, 418, and 518 of FIGS. 3, 4, and 5, respectively, will now be given. In-order store operations may be performed (at optional step 524 of FIG. 5) by performing a load operation from the corresponding address. If in-order store operations are not performed for stack references, then one implementation of a consistency-preserving mechanism forces all stack rename registers to its corresponding stack locations. This can be implemented as either a distinct mechanism, or by activating mechanism 4 of FIG. 6 which discards all out-of-order operations and has been extended to preferably for all stack rename locations to memory. In another embodiment, load references to the local processor stack may also be bypassed directly from the rename registers.

If multiple values are present, then the last value written before the current load operation must be retrieved in steps 318 and 418 of FIGS. 3 and 4, respectively. One way to do this is to discard all instructions following the present load operation.

Consistency-preserving mechanisms for store operations can include discarding all out-of-order state by activating mechanism 4 of FIG. Mechanism 4 discards all out-of-order operations and can be preferably extended to all stack rename locations to memory. When execution restarts, the modified value will loaded from memory by step 316 of FIG. 3 or step 426 of FIG. 4.

Special care needs to be taken if stack load and store operations refer to data types of different sizes. If the load operation refers to a subset of data bits provided by the store operation, then these can be extracted in a simple manner. If the data referred to by a load operation is resident in one or more stack rename registers and possibly processor main memory, then more complex data gathering is required.

According to one embodiment of the present invention, at least all overlapping registers are written to main memory and a memory read operation is performed. This is particularly simple if, in step 524 of FIG. 5, memory write instructions are entered into the instruction stream to record all stack references in processor memory in-order.

According to another embodiment of the present invention, the processor discards all speculative state, forces all stack references to memory, and performs the memory load operation in-order. Again, this is particularly simple if, in step 524 of FIG. 5, memory write instructions are entered into the instruction stream to record all stack references in processor memory in-order.

When the processor rename mechanism runs out of rename registers, rename registers which have no references in pending instructions may be reclaimed and their contents written to the processor memory. This may require that the value stored by the rename register be written to memory if no in-order stores have been inserted in step 524 of FIG. 5.

In an optimized embodiment, a predictor is used to decide which stack references to rename into processor registers in step 424 of FIG. 4 and step 520 of FIG. 5 to reduce the number of registers allocated to stack references; Stack references not allocated in a processor register are performed by using load and store instructions into the main memory.

According to one embodiment of the invention, rename registers can be shared for processor register and stack reference renaming. According to another embodiment of the invention, they are separate resources.

According to an optimized embodiment, renaming of stack references is combined with the elimination of copy operations, thereby reducing the critical path.

According to one embodiment, stack references are named using symbolic names of the for "stack pointer value+displacement". In this case, synchronization of names is required when the stack pointer contents are changed. Also, the distance between frame pointer and stack pointer is used to translate FP-relative references to SP-relative references.

According to another embodiment, addresses (e.g., effective, virtual or physical) are used to name the stack pointer. In an optimized embodiment, the stack pointer (and optionally, frame pointer, argument pointer, etc.) are shadowed in the rename unit, and speculatively adjusted in synchronization with the instruction stream being fetched. This reduces the number of memory ports necessary to the register file and allows more aggressive speculation during renaming.

According to one embodiment, consistency-preserving operations for accesses to the local stack are implemented in hardware by associating each renamed stack reference with address information and performing a lookup of renamed stack references to determine whether the requested data is in a rename register or in an actual memory location. According to another embodiment, this is implemented using software only: a reference to a stack area using a general register causes an exception, and software synchronizes the renamed values with the present request.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for renaming memory references to stack locations in a computer processing system comprising a plurality of processors, comprising the steps of:
   fetching, by a first processor, an instruction referencing a stack;
   replacing the instruction referencing the stack with a reference to a processor-internal register of the first processor and entering the reference to the processor-internal register in a dispatch table upon determining that the instruction uses an architecturally defined stack access method; and
   performing a consistency-preserving operation to recover an in-order value for the instruction referencing the stack from a main memory, and entering the in-order value in the dispatch table upon determining that the stack reference references a register of a second processor.

2. The method according to claim 1, wherein said step of performing the consistency-preserving operation comprises the step of bypassing a value from a given processor-internal register to a load operation that references a stack area and that does not use the architecturally defined stack access methods.

3. The method according to claim 1, further comprising the step of synchronizing an architected state between the processor-internal registers and a main memory of the computer processing system, and wherein said step of performing the consistency-preserving operation recovers the in-order value for the stack reference from the main memory, upon performing said synchronizing step.

4. The method according to claim 3, wherein the in-order value is written to the main memory by an in-order write operation inserted into an instruction stream containing an instruction corresponding to the instruction referencing the stack, when the instruction referencing the stack is a write stack reference.

5. The method according to claim 3, further comprising the step of writing the in-order value to the main memory in response to a load operation that does not use the architecturally defined stack access methods.

6. The method according to claim 1, wherein said step of performing a consistency-preserving operation comprises the steps of:
   discarding all out-of-order state;
   synchronizing an architected state between the processor-internal registers and the main memory of the computer processing system; and
   restarting execution after a store operation has been performed that does not use the architecturally defined stack access methods.

7. The method according to claim 1, wherein the architecturally defined stack access methods comprise memory accesses that use at least one of a stack pointer, a frame pointer, and an argument pointer.

8. The method according to claim 1, wherein the architecturally defined stack access methods comprise push, pop, and other stack manipulation operations.

9. The method according to claim 1, further comprising synchronizing an architected state between the processor-internal registers and a main memory of the computer processing system.

10. The program storage device according to claim 9, wherein said synchronizing step comprises the step of inserting in-order write operations for all of the stack references that are write stack references.

11. A program storage device readable by machine, tangibly embodying a program of instructions executable by the machine to perform methods steps for renaming memory references to stack locations in a computer processing system comprising a plurality of processors, the method steps comprising:

fetching, by a first processor, an instruction referencing a stack;

replacing the instruction referencing the stack with a reference to a processor-internal register of the first processor and entering the reference to the processor-internal register in a dispatch table upon determining that the instruction uses an architecturally defined stack access method; and performing a consistency-preserving operation to recover an in-order value for the instruction referencing the stack from a main memory, and entering the in-order value in the dispatch table upon determining that the stack reference references a register of a second processor.

12. The program storage device according to claim 11, wherein said step of performing a consistency-preserving operation comprises the step of bypassing a value from a given processor-internal register to a load operation that references a stack area and that does not use the architecturally defined stack access methods.

13. The program storage device according to claim 11, further comprising the step of synchronizing an architected state between the processor-internal registers and a main memory of the computer processing system, and wherein said step of performing the consistency-preserving operation recovers the in-order value for the stack reference from the main memory, upon performing said synchronizing step.

14. The program storage device according to claim 13, wherein the in-order value is written to the main memory by an in-order write operation inserted into an instruction stream containing an instruction corresponding to the instruction referencing the stack, when the instruction referencing the stack is a write stack reference.

15. The program storage device according to claim 13, further comprising the step of writing the in-order value to the main memory in response to a load operation that does not use the architecturally defined stack access methods.

16. The program storage device according to claim 11, wherein said step of performing a consistency-preserving operation comprises the steps of:

discarding all out-of-order state;

synchronizing an architected state between the processor-internal registers and the main memory of the computer processing system; and restarting execution after a store operation has been performed that does not use the architecturally defined stack access methods.

17. The program storage device according to claim 11, further comprising synchronizing an architected state between the processor-internal registers and a main memory of the computer processing system.

18. The program storage device according to claim 17, wherein said synchronizing step comprises the step of inserting in-order write operations for all of the stack references that are write stack references.

* * * * *